United States Patent [19]

Milo

[11] Patent Number: 5,748,396
[45] Date of Patent: May 5, 1998

[54] ARRANGEMENT AND METHOD FOR OPTIMIZING THE RECORDED SIGNAL TO NOISE RATIO IN CONTACT RECORDING SYSTEMS

[75] Inventor: Richard K. Milo, Lake Forest, Calif.

[73] Assignee: Seagate Technology, Inc., Scotts Valley, Calif.

[21] Appl. No.: 557,771

[22] Filed: Nov. 13, 1995

[51] Int. Cl.$^6$ .............. G11B 27/00; G11B 21/02
[52] U.S. Cl. .............. 360/31; 360/71; 360/77.01; 360/75
[58] Field of Search .............. 360/31, 61, 130.2, 360/130.21, 130.22, 130.23, 130.24, 130.3, 109, 128, 75, 122, 125, 129

[56] References Cited

U.S. PATENT DOCUMENTS

| | | | |
|---|---|---|---|
| 2,750,449 | 6/1956 | Thompson et al. | 360/84 |
| 4,669,012 | 5/1987 | Tomita | 360/130.21 X |
| 4,777,544 | 10/1988 | Brown et al. | 360/75 |
| 4,949,208 | 8/1990 | Milo et al. | 360/129 |
| 5,047,884 | 9/1991 | Negishi et al. | 360/130.3 X |
| 5,060,104 | 10/1991 | Kitaori et al. | 360/84 X |
| 5,063,469 | 11/1991 | Tandai | 360/125 |
| 5,153,785 | 10/1992 | Muranushi et al. | 360/75 |
| 5,412,519 | 5/1995 | Buettner et al. | 360/73.03 |
| 5,448,439 | 9/1995 | Magnusson et al. | 360/130.24 |
| 5,526,207 | 6/1996 | Sawada et al. | 360/130.24 X |
| 5,585,978 | 12/1996 | Rottenburg et al. | 360/85 |

FOREIGN PATENT DOCUMENTS

| | | | |
|---|---|---|---|
| 1-169716 | 7/1989 | Japan | 360/75 |
| PCT/US93/05655 | 12/1993 | WIPO . | |

OTHER PUBLICATIONS

The Complete Handbook of Magnetic Recording, 3rd Edition, by Finn Jorgensen, p. 299, Fig. 12–19.

*Primary Examiner*—Aristotelis M. Psitos
*Assistant Examiner*—K. Wong
*Attorney, Agent, or Firm*—Lowe, Price, LeBlanc & Becker

[57] ABSTRACT

An arrangement and method for optimizing the recorded signal to noise ratio in contact recording systems reduces the contact pressure of the write transducer head and media interface. This reduction in contact pressure reduces the noise recorded onto the media.

22 Claims, 4 Drawing Sheets

ARRANGEMENT AND METHOD FOR OPTIMIZING THE RECORDED SIGNAL TO NOISE RATIO IN CONTACT RECORDING SYSTEMS

FIELD OF THE INVENTION

The present invention relates to recording of information onto a magnetic recording medium, and more particularly, to the optimization of the recorded signal to noise ratio in contact recording systems.

BACKGROUND OF THE INVENTION

In conventional recording systems, a recording medium, such as magnetic recording tape, is passed by a transducer that records the information onto the recording medium. In tape drives, a write head, serving as the write transducer, outputs a record field and the image of that field is recorded on the magnetic recording tape. In conventional contact recording systems, the read and write heads are brought into intimate spatial contact with the recording tape with a high contact pressure to provide the best recording of information on the recording tape.

A problem that has been observed in recordings (see *The Complete Handbook of Magnetic Recording*, 3rd Edition, by Finn Jorgensen, at page 299, FIGS. 12-19) that appears as elevated record noise spectra on tapes recorded on by a contact recording system. This noise, added during a recording made on erased tape, is especially noticeable in the low and medium wavelengths (100 to 1,000 microinches). In systems that have been especially designed to produce very low head electronic noise, the extra recorded tape noise is very apparent. This extraneous noise appears in testing regardless of the amount of signal being recorded, since an increase in signal recorded also causes a corresponding increase in the noise being recorded. The extraneous noise at long wavelengths leads to a low signal to noise ratio at these low frequencies, thereby reducing the performance of the system. There is therefore a need for a method and arrangement in which the recorded signal to noise ratio in a contact recording system is optimized.

SUMMARY OF THE INVENTION

These and other needs are met by the present invention which provides a method and arrangement for optimizing the recorded signal to noise ratio in a contact recording system which, in contravention to conventional practice, reduces the contact pressure thereby increasing the spacing of the recording head (or write transducer) with respect to the recording medium. Rather than maintaining a write transducer in as intimate a contact as possible with the recording medium, such as recording tape, the contact pressure at the transducer/media interface is reduced. This is done in any of a number of different ways according to different exemplary embodiments of the present invention. For example, in order to increase the spacing at the write transducer/media interface, certain exemplary embodiments of the present invention reduce the media tension (such as the tension in a recording tape), or reduce the write head exposure on recorders.

The present invention has applicability to many types of recording systems, such as those that have a write head which flies over the media. Hence, in such an embodiment, the flying height of the write head is maintained above a minimum value in order to prevent excess noise from being recorded. As in the other embodiments, the reduction of the contact pressure in this manner actually increases the signal to noise ratio of the recorded signal.

An advantage of the present invention is the superior signal to noise ratio compared to the conventional arrangements in which both the read and the write heads are situated with as intimate a contact as possible with the media. An embodiment of the present invention which satisfies the earlier stated needs includes a method of optimizing a recorded signal to noise ratio in a recording system and comprises the steps of positioning read and write transducers with respect to a recording medium to have a contact pressure with the recording medium. Information is recorded on the medium with the write transducer to produce a recording. The signal to noise ratio (SNR) of the first recording is measured. The contact pressure and spacing of the write transducer is then adjusted to reduce the contact pressure of the write transducer with respect to the recording medium. Information is then recorded on the recording medium with the write transducer to produce a new recording. The SNR of the new recording is then measured. The sequence of adjusting the contact pressure of the write transducer, making a new recording and measuring the SNR of this new recording, is repeated until the measured SNR reaches approximately a maximum value.

The foregoing and other features, aspects and advantages of the present invention will become more apparent from the following detailed description of the present invention when taken in conjunction with the accompanying drawings.

DETAILED DESCRIPTION OF THE ILLUSTRATIVE EMBODIMENTS

Figure 1:
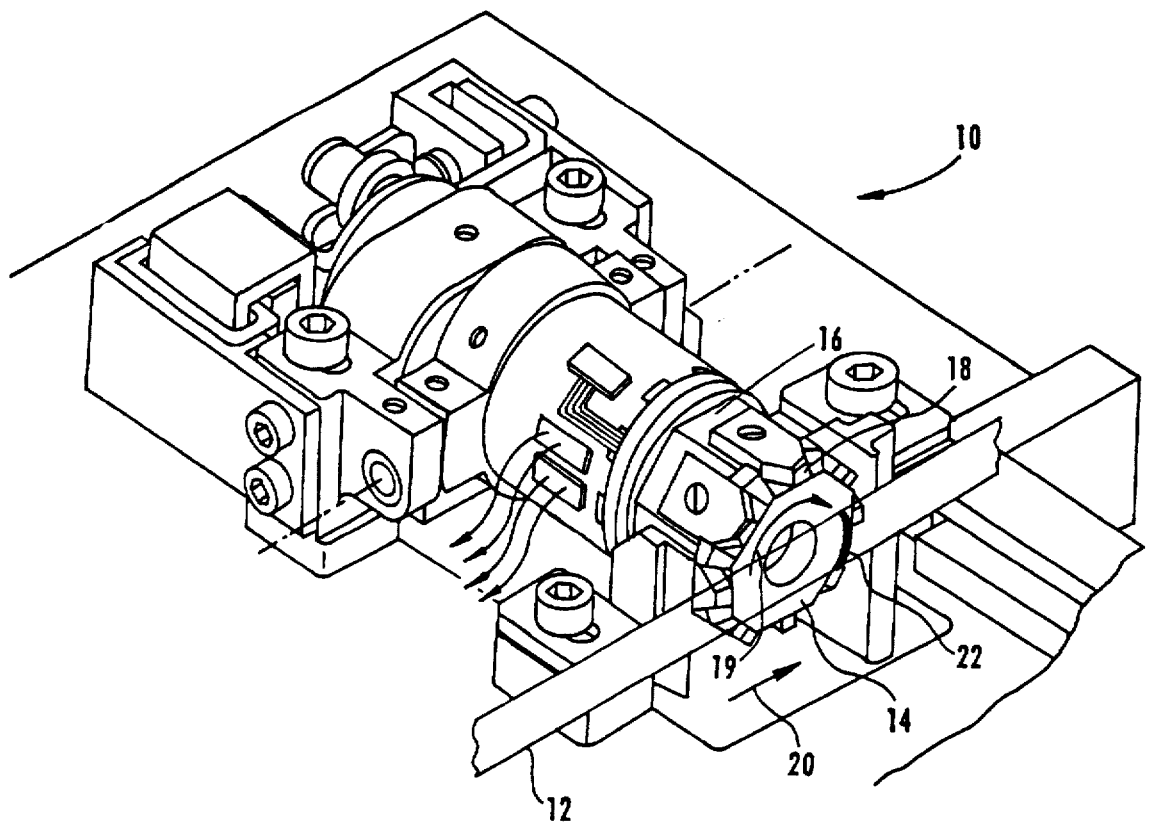
FIG. 1 is a perspective view of a recording system using an arcuate scanner instructed in accordance with the prior art.

FIG. 1 is a perspective view of a recording apparatus of the prior art. The recording apparatus is an arcuate scanner 10 in a tape drive. The arcuate scanner 10 records information on a magnetic recording tape 12 that passes over the end face 14 of a rotating drum 16. Around the outer periphery of the rotating drum 16 are a plurality of transducers 18. Some of these transducers are write transducers for writing information onto the magnetic recording tape, while other ones of the transducers are read transducers that read information from the recording tape. An example of an arcuate scanner is provided in PCT Application No. PCT/US93/05655, herein incorporated by reference.

As the drum 16 rotates in the direction of arrow 19, the tape is advanced in the direction of arrow 20. The individual transducers 18 contact the recording tape 12 along an arcuate path (schematically indicated as reference numeral 22 in FIG. 1). Data is therefore recorded on an arcuate track 22 across the recording tape 12, and the information may be read from the arcuate track 22 by a read transducer 18 that scans across the recording tape 12 along the track 22.

Figure 2:
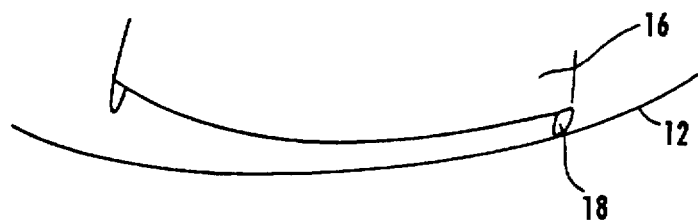
FIG. 2 is a schematic top view of the end face of the scanner, depicting the head/tape interface.
Figure 3:
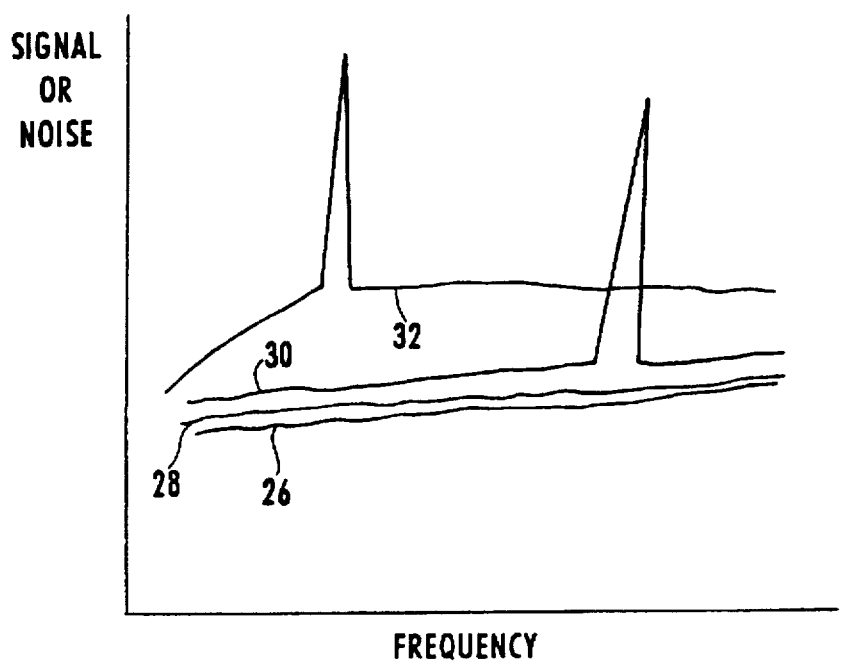
FIG. 3 is a plot of the recorded signal and noise versus frequency for a recording system of the prior art.

As seen in the top view of the drum 16 depicted in FIG. 2, the recording tape 12 will normally contact the transducers 18 at one circumferential edge of the drum 16. In such prior art arrangements, in order to provide a high quality recording, it was previously believed by those of ordinary skill in the art that it was necessary to bring the transducers 18 into as intimate a contact as possible with the recording tape 12. This creates a high contact pressure on the recording tape 12 by the transducers 18. The common perception is that bringing the write transducer 18 as close as possible to the recording tape would provide better recordings and reduce the introduction of noise onto the recording. The noise spectra, however, for recordings by arrangements in which the write transducers have a high contact pressure and low spacings with the recording tape show an elevated recording noise at low frequencies. FIG. 3 is a plot of noise versus frequency for such a system. It should be recognized that the elevated recording noise is not limited to arcuate scanners, such as that shown in FIG. 1. Rather, the problem persists in other types of recording systems, such as standard longitudinally recording tape drives, video tape recorders, etc.

In FIG. 3, based on prior art recorders, curve 26 represents the noise level read back from a tape that has been AC erased (i.e. recorded with an alternating field that is too high in frequency to be reproduced by the read head). Curve 28 represents the noise level read back from the same tape after it has been DC erased (i.e. recorded with a non alternating field). The noise level from the DC erased tape is usually slightly higher than from the AC erased tape due to non-homogenates (magnetic and mechanical) in the magnetic coating. Curve 30 represents the reproduced signal from a high frequency (short wavelength) recording made with high contact pressure and subsequent low head to media spacing. It can be seen from the illustration that the recorded noise in the frequencies adjacent to the primary recorded signal are nearly the same as the noise levels found following a DC erasure. Curve 32 represents the signal and noise found following a recording when a low frequency (long wavelength) recording is made. In the areas adjacent to the primary recorded frequency, there is a large elevation of the noise above the level normally associated with a DC erasure of the media. Efforts to increase the long wavelength Signal to Noise ration by increasing the recorded field only result in simultaneously increasing both the recorded signal and the recorded noise for no net gain in SNR.

The present invention solves the problem of the elevated record noise at long wavelengths by reducing the contact pressure of the write transducer on the recording medium. This reduction in the contact pressure provides a surprising, but quite substantial, increase in the signal to noise ratio. For example, the signal to noise ratio may be increased by two to three dB, which represents approximately a 30% increase in performance with no penalty other than a slight increase in the write current. The increase in the signal to noise ratio increases the signal quality at very little additional penalty to SNR in a recording system. Alternatively, if the signal quality is maintained at the same level as in the prior art, the manufacturing tolerances may be altered (made less stringent) to reduce the cost of the recording system.

Figure 4:
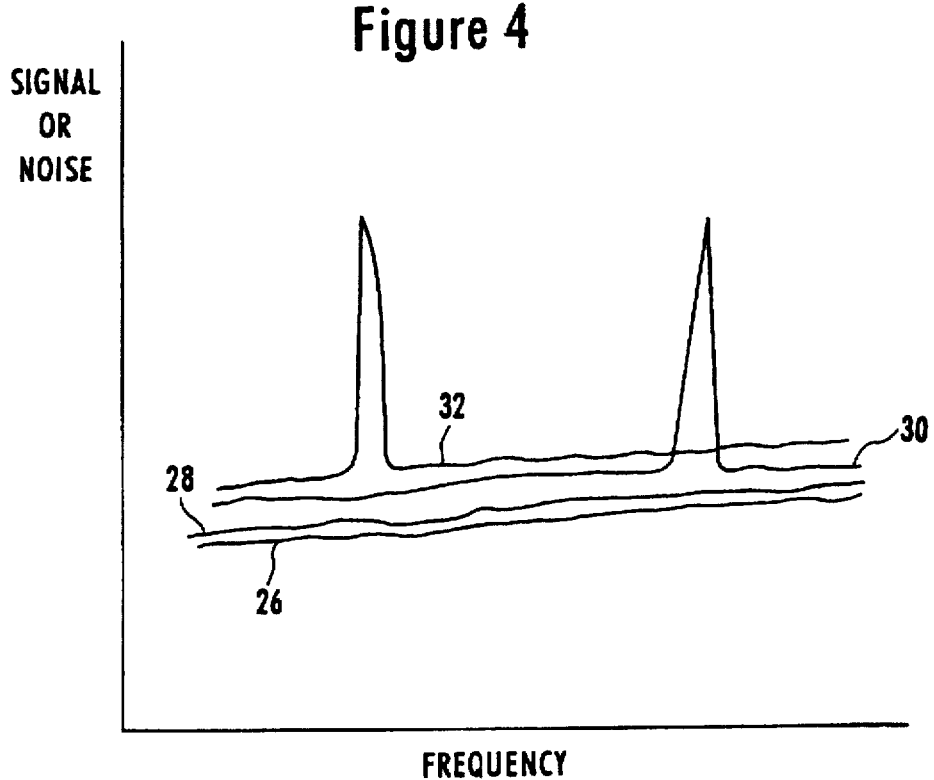
FIG. 4 is a plot of the noise versus frequency of a recording system constructed in accordance with embodiments of the present invention.

FIG. 4 depicts a plot of the noise versus frequency for a recording system constructed in accordance with an embodiment of the present invention, for a system which has been adjusted to optimize the signal to noise ratio in accordance with a method of the present invention. A comparison of the plot of FIG. 4 with the plot of prior art in FIG. 3 shows that the low frequency record noise is much less elevated when the contact pressure is reduced from that of the prior art. Both the high frequency and low frequency signals have a noise only slightly above that of the DC erase noise in the plot of FIG. 4.

Figure 5:
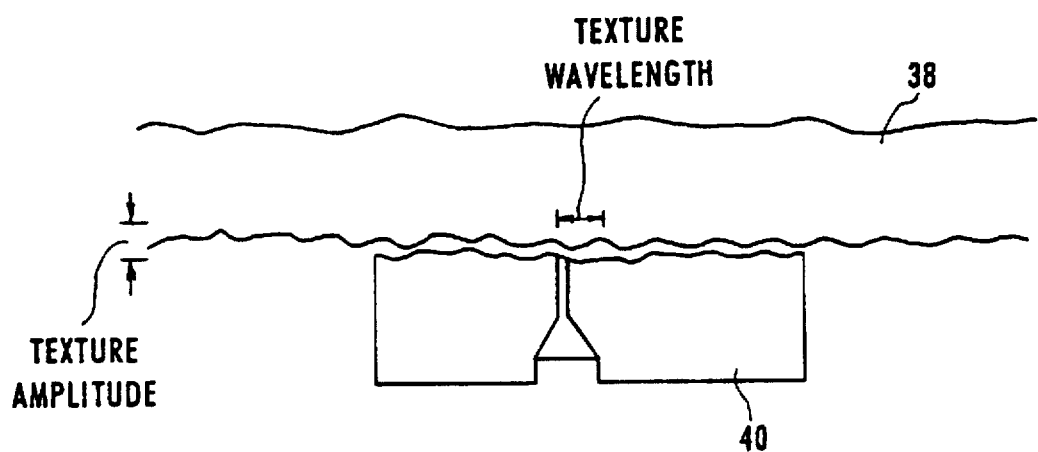
FIG. 5 is a schematic, greatly enlarged view of a head/media interface according to the prior art having a high contact pressure.

It is not completely understood why the record noise is elevated at low frequencies in the prior art systems, which have a high contact pressure. However, it is suspected by the inventor that the combined magnetic and mechanical texture of the media is somehow reflected onto the recording. FIG. 5 is an enlarged view of a head/media interface in which the head contacts the media with a high contact pressure, as in the prior art. Although the media 38 appears to have a smooth texture to the naked eye, the media texture actually has an amplitude and a wavelength. Similarly, the write head 40 also will have a texture with a texture amplitude and wavelength. The high contact pressure of the write head 40 onto the media texture 38 causes asperity contact, and produces the high record noise and subsequent low signal to noise ratio. It is believed that the noise is of the form of a multiplicative amplitude modulation that interacts with the record field from the write head 40, causing an "image of the media texture" to be recorded incoherently across the track width. The noise contamination is seen to be frequency dependent, with the noise contamination becoming worse as the recorded tone wavelength approaches the mechanical coating texture wavelength of the media.

Figure 6:
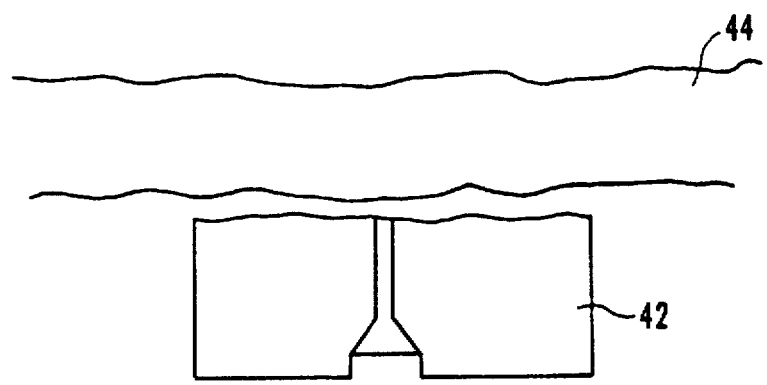
FIG. 6 is a view similar to FIG. 5 of a head/media interface, but with relatively low contact pressure and increased spacing in accordance with the exemplary embodiments of the present invention.

FIG. 6 is a view similar to FIG. 5, but of a media/head interface according to the present invention in which the head 42 contacts the media 44 with less contact pressure and larger spacing than that in FIG. 5. Therefore, there is less asperity contact, leading to a lower record noise and a higher signal to noise ratio. The lower contact pressure could be achieved in any of a number of different ways, according to different embodiments of the present invention. For instance, in FIG. 6, the media 44 and/or the write head 42 are provided with different textures than that of FIG. 5. Thus, the media 44 has a lower amplitude texture, and a lower wavelength texture. Alternatively, or additionally, the write head 42 has a texture with a lower amplitude texture or lower wavelength texture. These lower amplitude and wavelengths of the media texture and the head texture are achievable by techniques known to those of skill in the art. The different texture media 44 or write head 42 will produce a lower contact pressure of the write head 42 onto the media 44, leading to the unexpected benefit of lowering the record noise, and increasing the signal to noise ratio.

Also shown in FIG. 6 is another possible embodiment of the present invention in which the contact pressure is lowered from that of the prior art by increasing the spacing of the write head 42 from that of the media 44. The increase in the write head spacing is in contravention to the accepted wisdom of placing the write head into as intimate a contact as possible with the media in order to obtain the best signal quality.

Figure 7:
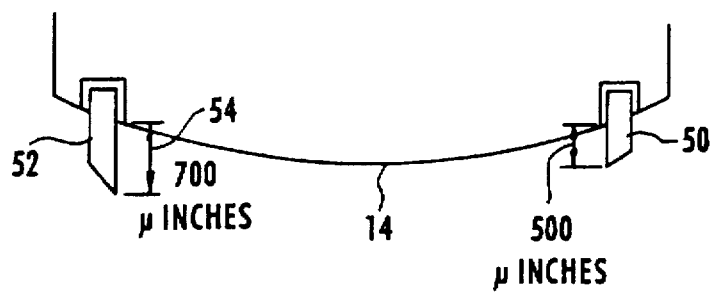
FIG. 7 is a top view of an arcuate scanner head constructed in accordance with an embodiment of the present invention.

For an arcuate scanner, such as that depicted in FIG. 1, a modification may be made to the mounting of the transducers 18 on the drum 16 to reduce the contact pressure of the write transducers 18 on the recording medium 12. A top view of the end of the scanner 10 is depicted in FIG. 7. The write transducer, referenced by numeral 50 in FIG. 7, is mounted to have less exposure than the read heads 52 of the scanner. Exposure (or protrusion) is defined as the extent of the head 50 or 52 above the end face 14 of the scanner. This is depicted as reference numeral 54 in FIG. 7. As an exemplary embodiment, the exposure of the read heads, which may still be maintained in intimate contact with the recording tape, may be set at 700 microinches of exposure, while the write head 50 may instead be set at 500 microinches of exposure. The lesser exposure of the write heads 50 above the scanner end face 14 reduces the contact pressure exerted by the write heads 50 on the recording tape 12.

Figure 8:
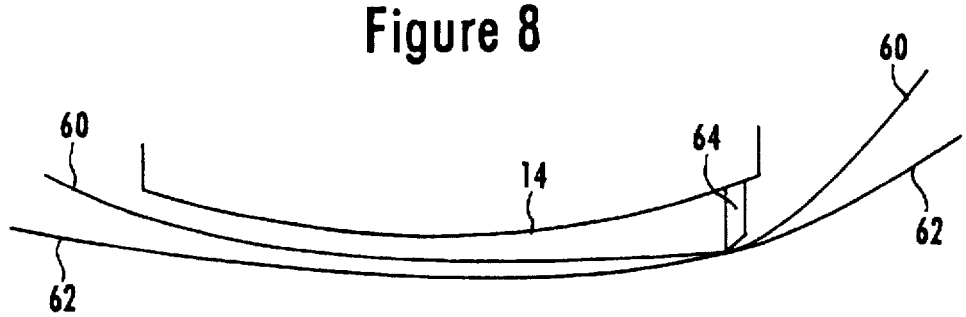
FIG. 8 is a top view of a scanner head detecting the head/media interface and the wrapped angle of a tape on the head, constructed in accordance with an embodiment of the present invention.

Another method of reducing the contact pressure on a write transducer is to change what is known as the "wrap angle". This is the angle formed between the tape and the write head or transducer. The degree of the write head wrap angle is related to the amount of normal force between the write head and the media. Thus, a reduction in the write head wrap angle reduces the normal force between the write head and the media, thereby reducing the contact pressure. A recording tape that has been wrapped on the write head with a relatively greater write head wrap angle (increased contact pressure) has reference numeral 60 in FIG. 8. Another recording tape 62 is also shown in FIG. 8, but this recording tape 62 has been wrapped on the write head 64 with a reduced write head wrap angle, thereby reducing the normal force and the contact pressure between the write head and the media.

Figure 9A:
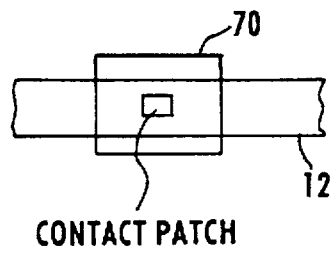
FIG. 9a is an end view of a recording head with a contact patch having a surface area in accordance with an embodiment of the present invention.
Figure 9B:
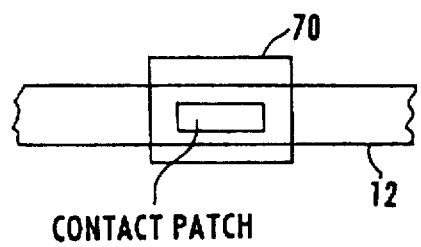
FIG. 9b is a view of a write head similar to that of FIG. 9a, but with a contact patch having a surface area in accordance with an embodiment of the present invention.

The surface area of the patch of contact of the recording tape with the record head is also related to the contact pressure. As seen in FIG. 9A, depicting an end view of a record head 70 of the prior art, a relatively small contact patch leads to a relatively high contact pressure on the tape 12. If the contact patch is made larger according to certain embodiments of the present invention, as depicted in FIG. 9b, the contact pressure of the head 70 on the tape 12 will be lessened.

The above described embodiments are exemplary only, as other types of contact recording systems are also benefited by the optimization of the signal to noise ratio in accordance with a method of the present invention. Furthermore, other methods of reducing the contact pressure are contemplated by the present invention, such as reducing the media tension (the tension of the recording tape, for example), thereby increasing the signal to noise ratio.

Although the present invention has been described and illustrated in detail, it is clearly understood that the same is by way of illustration and example only and is not to be taken by way of limitation, the spirit and scope of the present invention being limited only by the terms of the appended claims.

I claim:

1. A method of optimizing a recorded signal to noise ratio (SNR) in a recording system, comprising:

positioning read and write transducers with respect to a recording medium to have a contact pressure with the recording medium;

recording information on the medium with the write transducer to produce a recording;

measuring a noise level of the first recording to determine a SNR of the first recording;

adjusting the contact pressure of the write transducer to reduce the contact pressure of the write transducer with the recording medium;

recording information on the recording medium with the write transducer to produce a new recording;

measuring the noise level of the new recording to determine the SNR of the new recording; and repeating the steps of adjusting the contact pressure of the write transducer, recording information and measuring the SNR of the new recording, until the measured noise level reaches approximately a minimum value to achieve a maximum value of the SNR.

2. The method of claim 1, wherein the step of adjusting the contact pressure includes reducing an exposure of the write transducer to the recording medium.

3. The method of claim 1, wherein the write transducer has a flying height above the recording medium, and the step of adjusting the contact pressure includes adjusting the write transducer flying height.

4. The method of claim 1, wherein the recording medium is recording tape under tension, and the step of adjusting the contact pressure includes adjusting the tension of the recording tape.

5. The method of claim 1, wherein the recording medium is recording tape wrapped at an angle on the write transducer, and the step of adjusting the contact pressure includes adjusting the write head wrap angle.

6. The method of claim 1, wherein the recording medium contacts the write transducer on a contact patch on the write transducer, and the step of adjusting the contact pressure includes adjusting the surface area of the contact patch.

7. The method of claim 1, wherein the recording medium has an asperity texture with an amplitude, and the step of adjusting the contact pressure includes adjusting the amplitude of the asperity texture of the recording medium.

8. The method of claim 1, wherein the recording medium has a media texture with a roughness wavelength, and the step of adjusting the contact pressure includes adjusting the roughness wavelength of the recording medium.

9. The method of claim 1, wherein the write transducer has an asperity texture with an amplitude, and the step of adjusting the contact pressure includes adjusting the amplitude of the asperity texture of the write transducer.

10. The method of claim 1, wherein the write transducer has a media texture with a roughness wavelength, and the step of adjusting the contact pressure includes adjusting the roughness wavelength of the write transducer.

11. An arrangement for recording information on a recording medium, comprising:

a write transducer that writes information onto a recording medium, the write transducer having a determinable contact pressure with the recording medium, wherein the contact pressure is determined to provide approximately a minimum noise level recording of information on the recording medium to achieve a maximum signal to noise ratio (SNR) of the recording.

12. The arrangement of claim 11, wherein the determinable contact pressure is such that the write transducer has less than intimate contact with the recording medium.

13. The arrangement of claim 12, wherein the arrangement includes a magnetic recording apparatus, and the write transducer is a magnetic recording head, the magnetic recording apparatus also including a read head that has a higher contact pressure with the recording medium than the recording head.

14. The arrangement of claim 13, wherein the recording head is spaced further from the recording medium than the read head.

15. The arrangement of claim 14, wherein the read head is in intimate contact with the recording medium.

16. The arrangement of claim 14, wherein the recording medium is magnetic recording tape and the magnetic recording apparatus is an arcuate scanner, with a scanner head carrying the recording and read heads protruding from the scanner head by a determinable amount to contact the recording medium.

17. The arrangement of claim 16, wherein the read head protrudes from the scanner head by approximately 200 microinches more than the recording head, such that the read head has the higher contact pressure with the recording medium than the recording head.

18. The arrangement of claim 11, wherein the write transducer has a range of possible contact patches with the recording medium between a maximum contact patch and a minimum contact patch, the size of the contact patch being functionally related to the amount of contact pressure, the write transducer having a contact patch larger than the minimum contact patch to determine the contact pressure that provides approximately the maximum SNR recording of information on the recording medium.

19. The arrangement of claim 11, wherein the recording medium is tensionable between a maximum tension and a minimum tension, the tension of the recording medium being functionally related to the contact pressure and set to determine the contact pressure of the write transducer with the recording medium to provide approximately the maximum signal to noise ratio (SNR) recording of information on the recording medium.

20. The arrangement of claim 11, wherein the write transducer is a flying head with a determinable flying height over the recording medium, the flying height being set so as to determine the contact pressure that provides approximately the maximum SNR recording of information on the recording medium.

21. The arrangement of claim 11, wherein the write transducer is a recording head and the recording medium is magnetic recording tape wrapped at an angle on the recording head, the wrap angle having a range from a maximum wrap angle to a minimum wrap angle and functionally related to the contact pressure, the wrap angle being set so as to determine the contact pressure that provides approximately the maximum SNR recording of information on the recording medium.

22. A method of optimizing a recorded signal to noise ratio (SNR) in a recording system, comprising:

positioning read and write transducers with respect to a recording medium to have a first contact pressure with the recording medium;

recording information on the medium with the write transducer to produce a recording;

measuring a noise level of the first recording;

adjusting the contact pressure of the write transducer with the recording medium;

recording information on the recording medium with the write transducer to produce a new recording;

measuring the noise level of the new recording; and repeating the steps of adjusting the contact pressure of the write transducer, recording information and measuring the SNR of the new recording, until the measured noise level reaches approximately a minimum value to achieve a maximum value of the SNR.

* * * * *